US011227565B2

(12) United States Patent
Mertens et al.

(10) Patent No.: US 11,227,565 B2
(45) Date of Patent: Jan. 18, 2022

(54) METHOD FOR OPERATING AN INTERACTIVE VISIBILITY SCREEN, A PANE DEVICE AND A MOTOR VEHICLE

(71) Applicant: AUDI AG, Ingolstadt (DE)

(72) Inventors: Joris Mertens, Ingolstadt (DE); Georg Haslinger, Ingolstadt (DE); Jacques Hélot, Ingolstadt (DE); Markus Klug, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 385 days.

(21) Appl. No.: 15/611,272

(22) Filed: Jun. 1, 2017

(65) Prior Publication Data
US 2018/0012562 A1 Jan. 11, 2018

(30) Foreign Application Priority Data
Jul. 6, 2016 (EP) .................................... 16178172

(51) Int. Cl.
*G06F 3/0484* (2013.01)
*G06F 3/0488* (2013.01)
(Continued)

(52) U.S. Cl.
CPC .................. *G09G 5/10* (2013.01); *B60J 3/04* (2013.01); *B60K 35/00* (2013.01); *G06F 3/013* (2013.01);
(Continued)

(58) Field of Classification Search
CPC ...... G06F 3/04883; G06F 3/017; G06F 3/013; G06F 3/04847; G06F 2203/04808;
(Continued)

(56) References Cited

U.S. PATENT DOCUMENTS

2009/0058126 A1* 3/2009 Broude ...................... B60J 3/04
296/97.2
2015/0077327 A1* 3/2015 Pisz ................... B60H 1/00642
345/156

(Continued)

FOREIGN PATENT DOCUMENTS

CN 105584368 A 5/2016
EP 2857239 A1 4/2015
(Continued)

OTHER PUBLICATIONS

Chinese Application No. 201710403638.3, Office Action dated Aug. 1, 2019, with attachd English-language machine translation; 15 pages.

*Primary Examiner* — Roberto W Flores
(74) *Attorney, Agent, or Firm* — Sterne, Kessler, Goldstein & Fox P.L.L.C.

(57) ABSTRACT

The invention relates to a method for operating an interactive visibility screen on a transparent pane of a pane device, in particular in a motor vehicle. The visibility screen is generated by means of a display unit of the pane device on the pane by pixel-wise fade-in of opaque image points, wherein the image points form a coherent visibility screen area. In the method, an operational action by the user is first detected by means of a detection device, which comprises a selection of a setting range and a movement relative to the pane. Subsequently, an expansion of the visibility screen area at the setting range is set as a function of the detected movement by means of a control device.

18 Claims, 4 Drawing Sheets

(51) Int. Cl.
  *G09G 5/10* (2006.01)
  *B60J 3/04* (2006.01)
  *G09G 3/20* (2006.01)
  *B60K 35/00* (2006.01)
  *G06F 3/01* (2006.01)
  *B60J 1/20* (2006.01)

(52) U.S. Cl.
  CPC .......... *G06F 3/017* (2013.01); *G06F 3/04847* (2013.01); *G06F 3/04883* (2013.01); *G09G 3/20* (2013.01); *B60J 1/2011* (2013.01); *B60K 2370/146* (2019.05); *B60K 2370/1438* (2019.05); *B60K 2370/155* (2019.05); *B60K 2370/18* (2019.05); *B60K 2370/27* (2019.05); *B60K 2370/52* (2019.05); *G06F 2203/04804* (2013.01); *G06F 2203/04808* (2013.01); *G09G 2300/026* (2013.01); *G09G 2320/0626* (2013.01); *G09G 2354/00* (2013.01); *G09G 2380/10* (2013.01)

(58) Field of Classification Search
  CPC .......... G06F 2203/04804; B60K 35/00; B60K 2350/96; B60K 2350/1052; B60K 2350/1028; B60K 2350/352; G09G 5/10; G09G 2380/10; G09G 2354/00; B60J 1/2011

See application file for complete search history.

(56) References Cited

U.S. PATENT DOCUMENTS

2015/0097389 A1\* 4/2015 Dryselius .................. B60J 3/04
  296/96.19
2016/0104437 A1\* 4/2016 Iwakawa .............. G02B 6/0011
  345/690
2016/0132126 A1 5/2016 van Laack et al.

FOREIGN PATENT DOCUMENTS

EP 3006239 A2 4/2016
WO WO 2015/098312 A1 7/2015

\* cited by examiner

METHOD FOR OPERATING AN INTERACTIVE VISIBILITY SCREEN, A PANE DEVICE AND A MOTOR VEHICLE

TECHNICAL FIELD

The invention relates to a method for operating an interactive visibility screen on a transparent pane of a pane device. The invention also includes a pane device which is operable according to the method according to the invention. Finally, the invention also comprises a motor vehicle with the pane device according to the invention.

BACKGROUND

In motor vehicles, roller blinds are nowadays used as visibility screens. The roller blinds are, for example, a rollable fabric web, which is arranged on a window pane in a motor vehicle. If a driver or a passenger is dazzled in the motor vehicle, he can actuate the roller blind by pulling the fabric web over the window pane. One drawback of such a visibility screen is that a fixation of the rolled-off roller blind is necessary in order for the roller blind to remain in the rolled-out state. Due to the necessary fixation of the roller blind, only one position of the roller blind is adjustable, namely the one in which the roller blind is pulled completely over the window pane. Moreover, in case of a rolled-out roller blind, the window pane is not completely darkened by the fabric web, which furthermore leads to light incidence passing by the roller blind, which is disturbing to the driver or passenger.

BRIEF DESCRIPTION OF THE DRAWINGS/FIGURES

DETAILED DESCRIPTION

Figure 1:
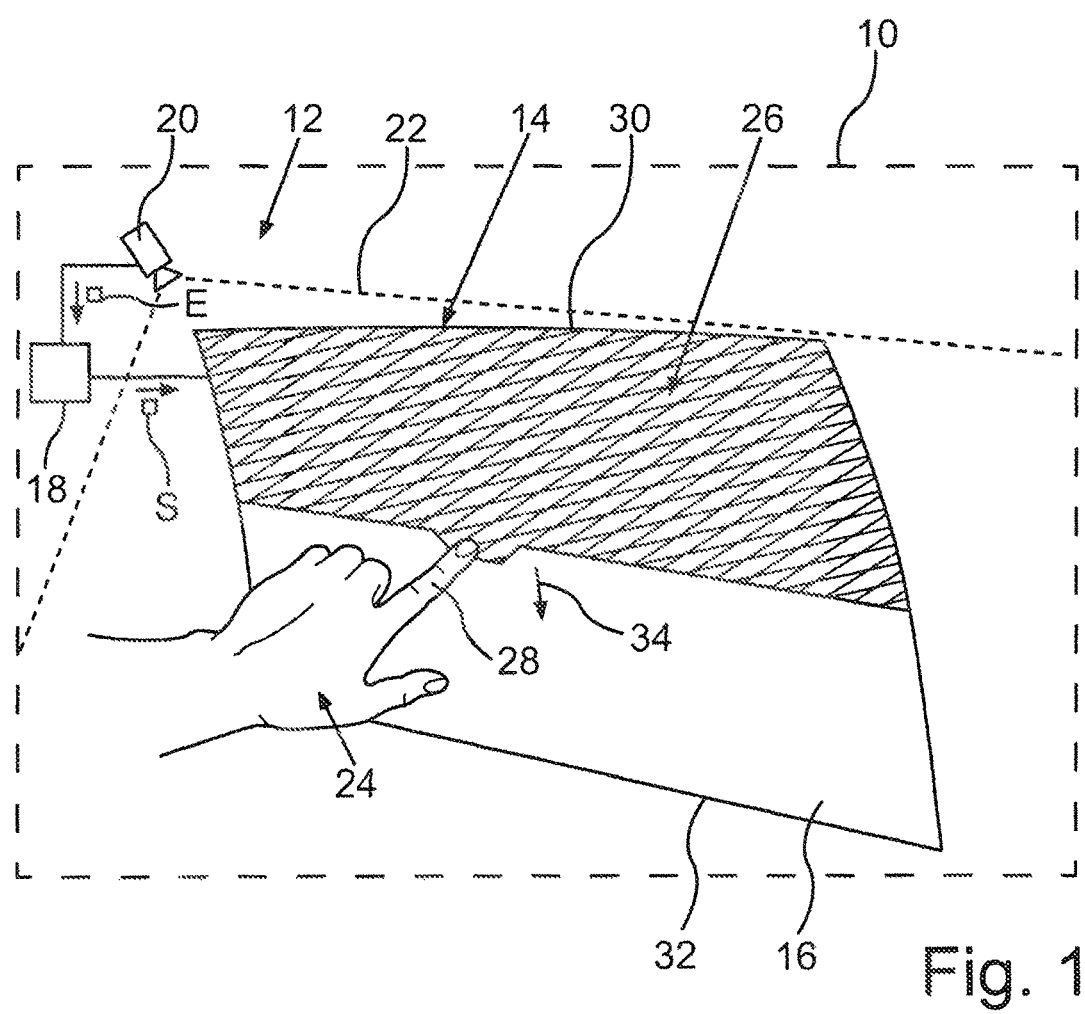
FIG. 1 illustrates a schematic representation of an embodiment of a motor vehicle with the pane device according to the invention and an interaction of a user with a visibility screen of the pane device.

It is therefore an object of the present invention to provide a particularly reliable and flexibly adjustable visibility screen.

The task is achieved by the subject matters of the independent claims. Advantageous further developments of the invention are disclosed by the features of the dependent claims, the following description, and the figures.

According to the invention, this object is achieved by a method for operating an interactive visibility screen on a transparent pane of a pane device. The visibility screen is generated by means of a display unit of the pane device on the pane by pixel-wise fade-in of opaque image points. The image points form a coherent visibility screen surface. In the method, an operational action is first detected by means of a detection device, which comprises a selection of a setting range and a movement relative to the pane. Subsequently, an expansion of the visibility screen area at the setting range is set as a function of the detected movement by means of a control device.

The method allows the user to interact with the visibility screen. The visibility screen extends over or covers initially at least partially, i.e. completely or partially, the transparent pane. In order to provide the visibility screen, opaque image points are faded in pixel-wise by means of the display unit. In other words, light-impermeable or opaque pixels are faded in by the display unit, which together form the light-impermeable or opaque visibility screen area of the visibility screen. In order for the visibility screen to at least partially overlap or cover the pane, the user can, for example, initially execute an activation gesture which is detected by the detection device. If the activation gesture is detected by the detection device, the detection device transmits a detection signal to the control device, which can then control the display unit, for example by transmitting the control signal to the display unit. By activating the display unit, said display unit displays the opaque image points in order to provide a coherent visibility screen area.

If the visibility screen area is provided, the user can then adjust the expansion of the visibility screen area of the visibility screen with the setting range selected by the user. Here, "expansion" preferably means an extension of the visibility screen area on or in the pane, i.e. the surface area of the visibility screen area.

The formation of a coherent visibility screen area causes a cover or darkening of the pane in a particularly reliable manner. While the user can set the extension of the visibility screen area by performing a control action, the user can adjust the visibility screen area according to his needs.

The invention also includes optional further developments, the features of which result in additional advantages.

According to a further development, during the setting of the expansion at the setting range, at least a predetermined area of the visibility screen area is opened as a function of the movement, and thereby the opaque image points are faded out. In particular, the at least one predetermined area is at least partially, i.e. partially or completely, surrounded by the remaining visibility screen area. As a result of the detected movement, the at least one predetermined area is preferably opened within the visibility screen area, whereby the pane is exposed or opened up in the at least one predetermined area. In other words, the movement preferably removes the at least one predetermined area of the visibility screen surface, or at the least one predetermined area image points of the display unit are controlled such that the opaque image points are not faded in. In other words, at least one peephole or hole or viewing, window is preferably provided inside the visibility screen area. The remaining visibility screen area surrounds or borders the at least one predetermined area. A user can thus look through the at least one predetermined area like through a peephole through the visibility screen area and through the transparent pane. Alternatively, a predetermined area, which is delimited by a frame of the pane, can be opened at a lower and/or upper and/or lateral edge of the visibility screen area. As a result, the visibility screen area can partially, i.e. not completely, surround the at least one predetermined range.

This results in the advantage that a user does not need to remove the entire visibility screen to be able to see through the pane. If, for example, the pane is used in a motor vehicle and the motor vehicle in which occupants or passengers sleep is driving at night, one of the occupants who is awake and wants to look outside through the pane without disturbing the others can make one or more peepholes In the visibility screen area of the pane.

A further embodiment of the invention provides that the at least one predetermined area is automatically closed after a predetermined period of time after execution of the detected movement. Here, "closing" preferably means that the display unit again fades in opaque image points in the at least one predetermined area, so that again a coherent or closed visibility screen area is formed. Here, period of time preferably means a time interval. The period of time can be stored, for example, by a timer of the control device. For example, the predetermined area may close after a predetermined period of time of 5 to 10 seconds after execution of the detected movement or the detected operational action.

Alternatively, by performing the movement, the user can keep the at least one predetermined area open. As soon as the user has finished the movement, the at least one predetermined area can immediately close again.

Automatically closing the at least one predetermined area results in the advantage that the interaction with the visibility screen is simplified for the user. As a result, the user does not have to carry out any further operational actions in order to restore the entire visibility screen area.

Advantageously, the at least one predetermined area remains open when, after the opening of the at least one predetermined area, a confirmation operation of the user is detected by means of the detection device. For example, the user can touch or tip on the pane with a finger of his hand at the at least one predetermined area. The confirmation operation fixes the at least one predetermined area. In order to display the confirmation transaction to the user, the display unit can show or display an icon, for example a pin, within the at least one predetermined area. The icon is intended to visualize for the user that the peephole generated by him—the at least one predetermined area—is fixed, i.e. remains in place and/or does not alter in its expansion.

A further advantageous embodiment of the invention provides that after the opening of the at least one predetermined area, a viewing direction of the user is detected and, as a function of the viewing direction, at least a predetermined area is moved within the visibility screen area.

The viewing direction of the user can be detected, for example, by the detection device of the pane device. For example, the detection device for detecting the viewing direction of the user may comprise a camera. Thus, for example, at least one predetermined area is opened by the user. The predetermined area then preferably remains open. After performing the operational action to open the at least one predetermined area, a viewing direction of the user can be detected. Preferably, the viewing direction of the user is directed at the area of the pane, at which the user wants to open the visibility screen—the setting range—when the at least one predetermined area is opened. If the detection device subsequently detects a change in the viewing direction, for example because the user fixes another point or area of the pane with his eyes, the at least one predetermined area can also move with the direction of the eye or the eye movement. The user can always see through the spot or the section through the pane, which he just fixed with his eyes or his gaze. As a result, the visibility screen is formed particularly flexible.

According to an advantageous further development, the expansion of the visibility screen area after a detection of the operational action on an area of the pane, which is accessible from the outside, is set only after identification of the user. In other words, to set the expansion of the visibility screen area by the operational action, authentication can be carried out on an area which is accessible from the outside of the pane. The identification of the user can occur, for example, by the detection device. The detection device can comprise, for example, the camera, which is also configured to detect the user. In other words, the detection device can operate in a camera-based manner and perform a face recognition. In addition or alternatively, the detection device can be configured to detect a portable mobile device of the user, in particular a mobile telephone and/or an electric clock, in particular a smart watch, and/or a tablet. The detection device can additionally or alternatively be radio-based. For example, the detection device can interrogate a digital identifier of the electronic device. Identification of the user or authentication is used to determine whether the user is authorized or entitled to perform the operational action. This results in the advantage that a security is provided in the interaction with the visibility screen. Only an authorized user can interact with the visibility screen.

A further advantageous embodiment of the invention provides that at least one first operating gesture is detected as a movement, wherein at least two fingers of a user's hand are moved relative to one another from a starting position during the first operating gesture. For example, the user can move at least two fingers away from each other. For example, in the starting position, the fingertips of the two fingers can first touch each other. The user can then move the two fingers away from each other. In other words, the user can move his two fingers from the starting position in opposite directions. Alternatively, the user can move the at least two fingers from the starting position towards each other. Thereby, the user can close or reduce the at least one predetermined area again. Alternatively or additionally, at least one second operating gesture can be detected as a movement, wherein in the second operating gesture, the user performs a wiping motion or painting motion on the pane or free in the air with one hand or at least one finger of the hand. In other words, as a second operating gesture, the user can move his hand or at least one finger of the hand in a smoothly flowing movement.

The operating gesture—first operating gesture and/or second operating gesture—preferably correlates with an expansion of the at least one predetermined area. For example, the at least one predetermined area is formed by whichever of the areas or whichever area on the pane the user touches by his hand or his finger and/or his fingers. Alternatively, the at least one predetermined area is formed along which areas of the pane the hand or the finger or at least two fingers move.

The user can specify or predetermine or determine the expansion and/or shape of the at least one predetermined area by means of the operating gesture—first operating gesture and/or second operating gesture. Here, "expansion of the predetermined area" preferably means an expansion of the at least one predetermined area within the visibility screen area.

In order to carry out the method according to the invention, the invention also provides a pane device. The pane device comprises a transparent pane. The transparent pane can, for example, be formed from glass or plastic. Preferably, the transparent pane is a window pane. Furthermore, the pane device comprises a display unit which is configured to generate an interactive visibility screen on the pane by pixel-wise fade-in of opaque image points. In this way, the image points form a coherent visibility screen area. Furthermore, the pane device comprises a detection device which is configured to detect an operational action of a user, which comprises a selection of a setting range and a movement relative to the pane. Finally, the pane device comprises a control device which is configured to set an expansion of the visibility screen at the setting range as a function of the detected movement.

The display unit preferably comprises an LCD display (liquid crystal display), in particular a transparent LCD display, and/or an OLED display, in particular a transparent OLED display, to be able to provide opaque pixels by means of pixel-like fade-in.

OLED displays cannot block or deflect light. A visibility screen or a visibility screen area can be implemented in an OLED display, for example, by spill. LCD displays can block light by polarization, but do not emit light. For this reason, LCD displays require, in particular, a background lighting. In order to be able to provide the visibility screen by pixel-like fade-in of opaque image points and to allow for predetermined areas by fade-out of opaque image points, preferably an LCD display or an LCD layer is arranged on a self-luminous OLED display or a self-luminous OLED layer as background illumination. The LCD layer is preferably used to display the visibility screen or the visibility screen area. Alternatively, an LCD layer with OLED layers arranged on both sides can be used for displaying, the visibility screen area. In other words, the display unit can comprise a layer structure composed of an OLED layer, an LCD layer, and a further OLED layer. Such a layer construction has the advantage that both sides can be controlled separately from one another and the contents can be recognized only from one viewing direction through the pane.

An LCD display, which may also be referred to as a liquid crystal display, is preferably a display or screen whose function is based on the fact that liquid crystals influence the polarization direction of light when a certain amount of electrical voltage is applied.

An OLED display is preferably a self-luminous display. Background lighting is not required for an OLED display compared to an LED display. The abbreviation OLED stands for organic light-emitting diodes. OLED displays have a predetermined structure with organic layers or films between two electrodes, the anode and the cathode. Preferably two kinds of organic materials are used with the organic films or layers. Suitable organic materials are, for example, aluminum hydroxyquinoline or long-chain polymers, for example polyparaphenylenevinylene.

An organic film, for example as a hole-conducting layer or a conductive polymer layer, is applied to a transparent anode, which consists, for example, of indium tin oxide (ITO) and is located on a pane, in particular a glass pane. A second organic layer, for example an emissive polymer layer, with a cathode consisting of metals such as barium or calcium is applied to the organic film. The last plane is a further pane, which is designed in particular as a glass pane. The thickness of the entire module, i.e. of the OLED display, is preferably determined by the thickness of the panes. If a voltage is applied, electrons (negative charges) are injected from the cathode and simultaneously holes (positive charges) are injected into the organic material from the high-pressure anode. In the applied electric field, holes and electrons migrate through the organic film and form excited states during their recombination, which decompose when photons are emitted and generate light.

By means of such a configuration of the LCD display and/or OLED display, the LCD display and/or the OLED display are preferably configured to display pixel-wise opaque image points.

A display unit can be provided in a particularly simple and reliable manner by means of the LCD display and/or the OLED display. Furthermore, LCD and/or OLED displays comprise a particularly low thickness. If the display is preferably arranged on the pane, the pane thickness is only insignificantly increased.

An advantageous embodiment provides for the detection device to comprise at least one camera and/or at least one touch-sensitive operating surface, in particular a transparent touch film. The touch-sensitive operating surface preferably comprises an electrode layer. In particular, a matrix of electrodes is provided in the touch-sensitive operating surface, one coordinate being assigned to each electrode. The touch-sensitive operating surface is preferably arranged on the display unit. For example, the pane device can have a predetermined layer structure consisting of pane, display unit and touch-sensitive operating surface. Alternatively, the touch-sensitive operating surface may also form a surface of the display unit. In other words, the touch-sensitive operating surface can be integrated into the display unit. An operational action of the user and a selection of the setting range of the user can be detected particularly simply and reliably by the camera and/or the touch-sensitive operating surface.

Advantageously, the touch-sensitive operating surface is arranged on a pane area of the pane. Furthermore, the detection device can have an additional touch-sensitive operating surface, wherein the additional touch-sensitive operating surface is arranged on a pane area opposite the pane area of the pane. This allows a user to interact with the visibility screen on both sides of the pane. This is, for example, advantageous if the pane is designed as a side pane of a motor vehicle. In this embodiment, when the user sets the visibility screen area, the user can see from the outside whether there is still something inside the motor vehicle.

The pane device can be implemented in the described manner in a motor vehicle. Accordingly, the invention also provides a motor vehicle with an embodiment of the pane device according to the invention. The motor vehicle according to the invention is preferably designed as a motor vehicle, in particular as a passenger motor vehicle. The pane of the pane device preferably forms a window pane of the motor vehicle, for example a rear window and/or side window and/or front window.

An advantageous development of the invention provides that the pane device has an additional detection device, which is directed at a surrounding area of the motor vehicle. The control device of the pane device is thereby configured to assign a point fixed by the user's eyes through the at least one predetermined area in the surroundings of the motor vehicle to an image point detected by the additional detection device and to shift the at least one predetermined area within the visibility screen area such that the point fixed by the user can continue to be fixed by the user through the at least one predetermined area while the motor vehicle is moving. As a result, the visibility screen is formed particularly flexible. The user can thereby view, for example, an object or a person through the predetermined area and the pane even if the motor vehicle is moving.

Alternatively, other components of the motor vehicle can also be replaced by the pane. For example, a floor and/or a roof of the motor vehicle can be at least partially formed by the pane. In other words, the pane can form a side panel and/or a roof liner and/or a floor of the motor vehicle. The pane can thus be used in the motor vehicle where a sheet metal or an alternative motor vehicle component forms the side panel and/or the roof liner and/or the floor of the motor vehicle.

For example, the pane can be arranged in the motor vehicle, where, for example, a sliding roof is arranged. The pane can thus form, for example, at least a part of the roof liner of the motor vehicle. In order that, on a sunny day, the sun or the light does not shine via the pane in the roof liner of the motor vehicle into the interior of the motor vehicle, the pane can be covered with the visibility screen. If the user wants to see through the roof liner of the motor vehicle anyway, he can make a peephole "in" the roof liner through the operational action at the pane. For this purpose, he carries out the first operating gesture with his fingers, for example. If the user would like to create several peepholes in the pane "in" the roof liner, he can carry out the first operating gesture at different setting ranges on the pane.

In order to form the floor and/or the roof or the roof liner and/or the side panel of the motor vehicle at least partly or partially by the pane, it may be necessary for the pane to have a predetermined mechanical stability such that, for example, in the event of an accident or crash of the motor vehicle, the safety of the occupants of the motor vehicle is ensured. For example, the pane can be designed as armored glass and/or composite safety glass.

Certain components in the motor vehicle, such as, for example, areas of the side panel, cannot be formed by a pane for ensuring safety. However, in order to provide a user with a view or a field of view from the motor vehicle, for example through the areas of the side panel, the pane device can comprise a further display unit. This further display unit can abut or adjoin a pane edge of the pane. Furthermore, the detection device can comprise a camera which is directed towards a surrounding of the motor vehicle and is arranged to detect image data, wherein the further display unit is arranged to display the image data acquired by the camera in order to produce a field of view into the surrounding of the motor vehicle that is enlarged in relation to the pane. The user is preferably provided with a field of view through the pane into the surroundings of the motor vehicle. By means of the further display unit, a field of view enlarged relative to the field of view of the pane can be provided.

The advantages and preferred embodiments described for the method according to the invention also apply to the motor vehicle according to the invention and the pane device according to the invention and vice versa.

Figure 2:
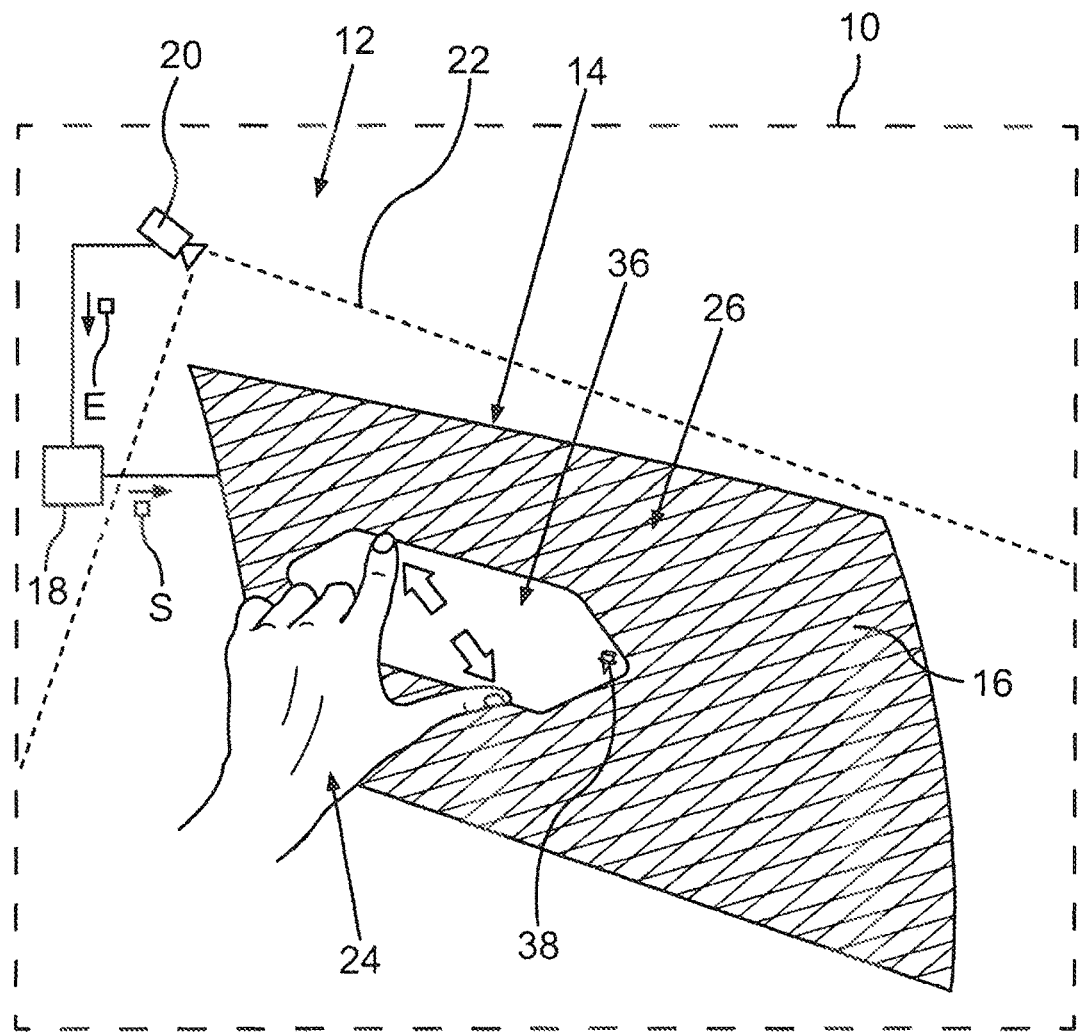
FIG. 2 illustrates a schematic representation of the motor vehicle with the pane device of FIG. 1 in the case of a further interaction of the user with the visibility screen of the pane device.
Figure 3:
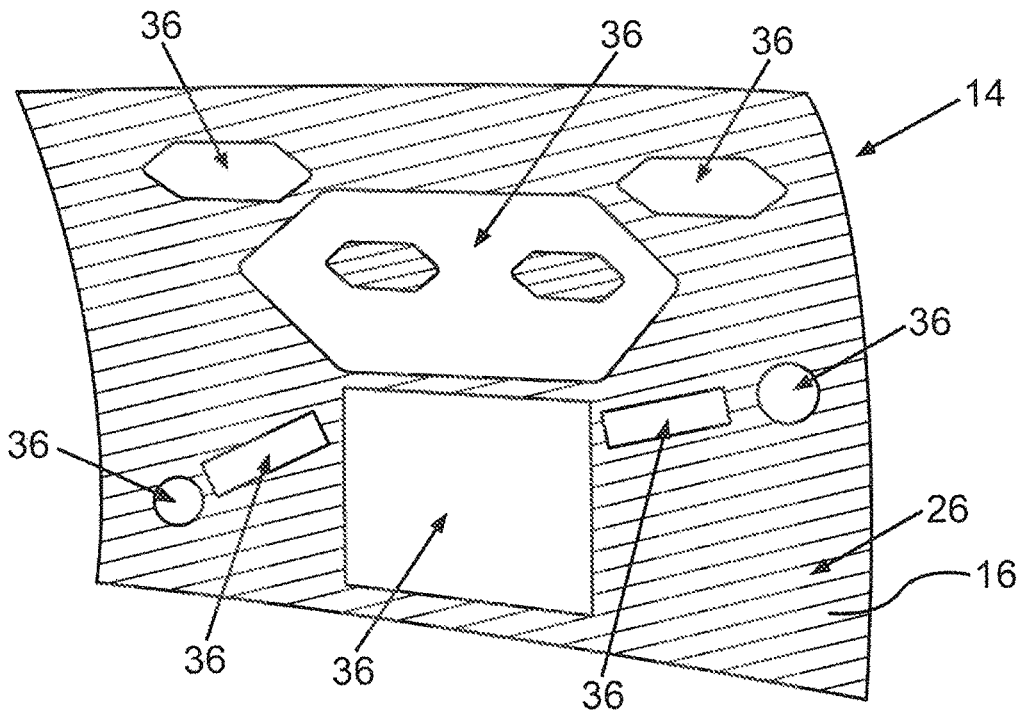
FIG. 3 illustrates a schematic representation of the motor vehicle with the pane device of FIG. 1 in the case of a further interaction of the user with the visibility screen of the pane device.
Figure 4:
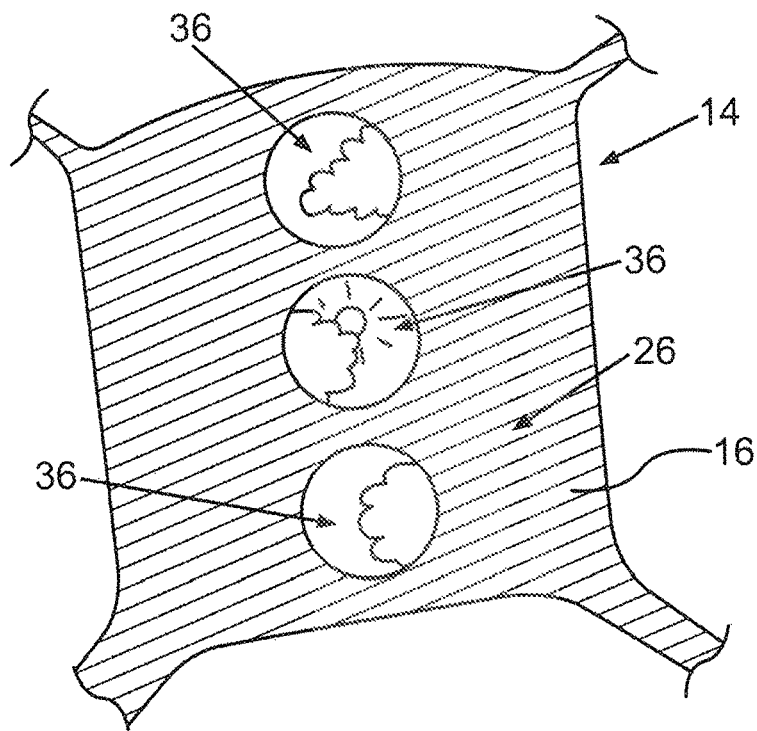
FIG. 4 illustrates a schematic representation of the motor vehicle with the pane device of FIG. 1 in the case of a further interaction of the user with the visibility screen of the pane device.
Figure 5:
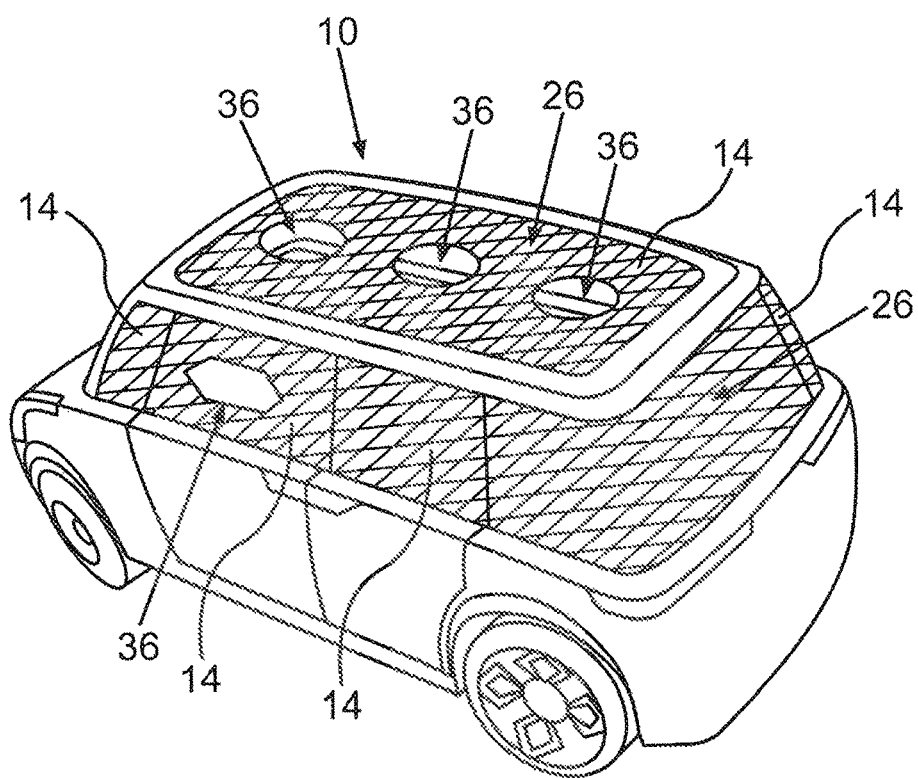
FIG. 5 illustrates a schematic representation of the motor vehicle with the pane device.

In the following, an exemplary embodiment of the invention is described. This shows:

FIG. 1 a schematic representation of an embodiment of a motor vehicle with the pane device according to the invention and an interaction of a user with a visibility screen of the pane device;

FIG. 2 a schematic representation of the motor vehicle with the pane device of FIG. 1 in the case of a further interaction of the user with the visibility screen of the pane device;

FIG. 3 a schematic representation of the motor vehicle with the pane device of FIG. 1 in the case of a further interaction of the user with the visibility screen of the pane device;

FIG. 4 a schematic representation of the motor vehicle with the pane device of FIG. 1 in the case of a further interaction of the user with the visibility screen of the pane device; and FIG. 5 a schematic representation of the motor vehicle with the pane device.

The exemplary embodiment described below is a preferred embodiment of the invention. In the exemplary embodiment, the described components of the embodiment respectively represent single features of the invention, which features are to be considered independently of one another and are respectively further developed independently of one another by the invention and which features are thus also to be considered individually or in a combination other than the one shown as a component of the invention. Additionally, the described embodiment is also expandable by additional, already described features of the invention.

In the figures, elements which are functionally equivalent are each provided with the same reference symbols.

FIG. 1 shows a motor vehicle 10 with a pane device 12. The pane device 12 comprises a transparent pane 14, a display unit 16, a detection device and a control device 18. As shown in FIG. 1, the detection device can comprise, for example, a camera 20. The camera 20 applies a detection area 22. For example, the camera 20 detects as a detection area 22 an area of an interior space of the motor vehicle 10.

The display unit 16 preferably comprises the same dimensioning as the pane 14. In other words, the display unit 16 is preferably arranged in overlapping relationship with the pane 14. The pane 14 is preferably a window pane of the motor vehicle 10. For example, the pane 14 can form a front pane or side pane or rear pane of the motor vehicle 10. The motor vehicle 10 preferably comprises several such panes 14. The pane 14 is preferably formed of glass or plastic.

The display unit 16 can, for example, be designed as an OLED display, in particular a transparent OLED display. Alternatively, the pane 14 can also be a component of the OLED display. The display unit 16 is configured to generate a visibility screen 26 by pixel-wise fading in opaque image points, wherein the image points form a coherent visibility screen area.

In combination of FIGS. 1 to 4, the method for operating the interactive visibility screen 26 of the pane device 12 will be explained in more detail below.

The detection device, such as, for example, the camera 20, is configured to detect an operational action of a user 24. For the visibility screen 26 to at least partly cover or cover the pane 14, the user 24 can first execute an activation gesture which is detected by the detection device. If the activation gesture is detected by the detection device, it transmits a detection signal E to the control device 18, which can then control the display unit 16, in that the control device 18, for example, transmits a control signal S to the display unit 16. By controlling the display unit 16, said display unit displays the opaque image points in order to provide a coherent visibility screen area. In FIG. 1, the user 24, for example, performs the activation gesture with a finger 28. In this case, the user 24 moves the finger 28 from a top edge of a pane 30 toward a bottom edge of a pane 32. FIG. 1 illustrates this by the arrow 34. The activation gesture can be detected, for example, by the camera 20.

Alternatively or additionally, the display unit 16 can also have a touch-sensing or touch-sensitive control surface, which is configured to detect a movement of the hand or the finger 28 on the pane 14. For example, the touch-sensitive control surface can be designed as a touch film. The touch-sensitive control surface is preferably arranged on the pane 14. Preferably, the touch-sensitive control surface extends over a pane area, which is coverable by the visibility screen area. The touch-sensitive control surface preferably comprises an electrode layer for this purpose. In particular, a matrix of electrodes is provided in the touch-sensitive operating surface, one coordinate being assigned to each electrode. The position of the finger 28 or the hand on or at the touch-sensitive control surface or pane 14 can be determined.

By means of the activation gesture, the visibility screen 26 can be displaced or moved, for example, into a darkening position from a reference position, in which the pane 14 is completely exposed. The visibility screen 26 can thus be displaced from the reference position until the user 24 terminates the activation gesture. If, for example, the user 24 moves the hand or the finger 28 from the upper edge 30 of the pane to the lower edge 32 of the pane, the pane 14 is completely covered or overlaid by the visibility screen area of the visibility screen 26. If the user 24 does not move the hand or the finger 28 as far as the bottom edge 32 of the pane, but only up to a predetermined point on the pane 14, the visibility screen area of the visibility screen 26 covers the pane 14 only in certain sections or partially. In FIG. 1, for example, the visibility screen area covers one half of the pane 14.

The visibility screen 26 can be, for example, a roller blind, which is actuated by the user 24. The specific design of the visibility screen or the roller blind can be designed by means of the display unit 16. For example, the roller blind can be represented by physical materials such as, for example, a fabric web or by slats.

If the visibility screen area now covers the pane 14 partially or completely, the user 24 can set an expansion of the visibility screen area. For this purpose, the detection device detects an operational action by the user 24. The detected operational action comprises a selection of a setting range and a movement of the hand or finger 28 or a plurality of fingers of the hand relative to the pane 14. The setting range is selected by the user 24 in such a way that the user 24 positions his hand or at least a finger 28 of his hand relative to the pane 14. Subsequently, a movement of the hand or finger 28 or a plurality of fingers is detected by the detection device.

An embodiment of a movement is shown in FIG. 2. This embodiment represents a first operating gesture. In the first operating gesture, the user 24 moves two fingers of the hand from a starting position away from each other. The movement is illustrated by the two arrows in FIG. 2. For example, the fingertips of the two fingers can touch in the starting position. Subsequently, the user 24 moves the two fingers away from each other. In other words, the user 24 can move his two fingers from the starting position in opposite directions. By the movement or the first operating gesture executed by the user 24, a predetermined area 36 of the visibility screen area is opened to a predetermined degree. In the at least one predetermined area 36, the pane 14 is exposed. In doing so, the remaining visibility screen area surrounds the at least one predetermined area 36. By the first operating gesture, the user 24 can thus form a peephole in the visibility screen area.

By means of the movement or operating gesture, the user 24 cannot only open the predetermined area 36, but can also immediately adjust a size or expansion of the predetermined area 36. For example, referring to FIG. 2, the at least one predetermined area 36 opens as far as the user 24 moves his two fingers apart. In FIG. 2, the at least one predetermined area 36 comprises a hexagonal shape. Alternatively, the at least one predetermined area 36 may also have a round or rectangular shape.

In order for the peephole or the predetermined area 36 not to close immediately after the first operating gesture has been executed, the user 24 can execute a confirmation gesture. For this purpose, the user 24, for example, can tap with his finger into the predetermined area 36 on the pane 14. Alternatively, the user 24 can also actuate a control element, such as a button, as a confirmation gesture. The display unit 16 may be configured to display an icon 38 in or at the predetermined area 36 in order to enable the user 24 to display the predetermined area 36. In FIG. 2, for example, a pin is faded in as icon 38 by the display unit 16.

The user 24 can also generate a plurality of peepholes or predetermined areas 36. This is shown, for example, in FIG. 3. The predetermined areas 36 comprise different shapes, as shown in FIG. 3. In order to design the predetermined areas 36 differently, the user 24 can perform a second operating gesture. In the case of the second operating gesture, the user 24 can carry out a wiping motion or movement with the hand or at least one finger 28 of the hand. In other words, the user 24 can move his hand or at least one finger 28 of the hand in a smoothly flowing movement as a second operating gesture. In other words, the user 24 can paint the predetermined area 36. The areas of the pane 14 over which the user 24 travels with his finger 28 or his hand are detected by the detection device and exposed or opened. The predetermined area 36, for example, may have a round or rectangular or triangular shape. Alternatively, the predetermined area may also comprise the form of a hexagon or slot or gap.

For example, a figure is painted in FIG. 3. FIG. 4 shows a further embodiment of an arrangement and configuration of the predetermined areas 36. The pane 14, for example, can form a roof liner of the motor vehicle 10. If the user 24 generates the predetermined areas 36, which are designed circular in FIG. 4, the user 24 can see the sky through the pane 14.

Alternatively or additionally, the user 24 can also adjust transparency levels of the visibility screen 26. For this purpose, he can, for example, operate an operating element of the pane device 12, such as a rotary knob, or manually set a transparency level by means of keys using an input of a numerical value. Thus, the transparency levels can be set between 0% and 90%. At 0%, the screen is completely impermeable to light or opaque.

In FIG. 5, the motor vehicle 10 is shown with a plurality of panes 14, each of which is darkened or covered by the visibility screen area of the visibility screen 26.

Alternatively or additionally, the user 24 can also actuate the visibility screen 26 from both sides of the pane 14. For this purpose, for example, a touch-sensitive control surface is arranged on one side of the pane 14 which faces an interior of the motor vehicle 10. In addition, the detection device can have a further touch-sensitive control surface, wherein the further touch-sensitive control surface is arranged on a side opposite of the side of the pane 14. This side, on, which the further touch-sensitive control surface is arranged, preferably faces a surrounding of the motor vehicle 10. As a result, a user 24 can interact with the visibility screen on both sides of the pane 14. As a result, the user 24 can also form peepholes from the outside on the pane 14 or the panes 14 and look into the interior of the motor vehicle 10 from the outside.

In order that not any user 24 can actuate the visibility screen 26, the detection device can first identify the user 24. This is in particular the case when the user 24 wants to set the visibility screen 26 from the outside. The detection device, for example, can comprise a further camera, which is configured to detect or identify the user 24. In addition or alternatively, the detection device can be configured to detect and identify a portable mobile device of the user, in particular a mobile telephone and/or an electric clock, in particular a smart watch, and/or a tablet. By the identification of the user 24 or the authentication, it is determined whether the user 24 is authorized or entitled to perform the operational action or setting of the visibility screen 26. If, for example, the user 24 approaches the motor vehicle 10 or the pane 14 from the outside, the detection device can first detect and identify the user 24. If the user 24 is identified, the detection device, for example, can transmit a confirmation signal to the control device 18 (not shown in FIG. 5). Only then can the user 24 set the visibility screen 26. As a result, the user 24, for example, can see into the interior of the motor vehicle 10 from the outside.

Overall, the invention describes a digital roller blind with interactive peepholes.

In a particularly preferred embodiment, the transparent pane of a vehicle can be provided with a display which has a digital roller blind or a digital visibility screen. For example, the roller blind can be pulled up or down with touch movements. When the roller blind is pulled down, peepholes can be made in the roller blind surface or in the visibility protection area of the roller blind.

After the roller blind has been pulled up or pulled down (or moved laterally), peepholes can be made or formed with touch motions at predetermined or random locations darkened by the roller blind. The peepholes can be returned automatically after a certain time or can be fixed with an additional operation.

When the occupant or user of the motor vehicle views a specific object through the peephole, the peephole can move in such a way that the particular object always remains visible despite the movement of the motor vehicle.

Additionally or alternatively, the pane may be provided with the roller blind wherever the side panel and/or the roof or floor is normally provided. There digital peepholes can be made or generated, so that one can look "through the metal sheet." In this embodiment one can look through the motor vehicle or motor vehicle components (for example, side panel). For example, to better park, better to see a traffic light or better to look at the landscape.

The pane can be additionally or alternatively provided with a touch film on the outside of the motor vehicle, so that a person entitled to do so, for example, after identification via mobile phone and/or camera and/or smart watch, can make peepholes from outside. In this embodiment, one can see from the outside whether there is still something inside the motor vehicle. Alternatively, the motor vehicle may have its own appearance.

For technical implementation, the panes or a pane of the motor vehicle are preferably provided with a display or displays. The display preferably has touch functions. For example, a transparent OLED display can be used as a transparent display.

The display and the pane are preferably transparent or translucent, so that, for example, one can see from an interior of the motor vehicle outwards into a surrounding of the motor vehicle. If necessary, the roller blind is provided by means of the display. With touch or gesture control, which can be detected by one camera or a plurality of cameras, the peepholes can be created.

The cameras can additionally or alternatively detect the eye movements of the user or occupant who has generated the peepholes and can link them to the objects which are outside the motor vehicle. For example, cameras which are directed outwards can be used for this purpose. When an object is viewed for a longer time in an surrounding of the motor vehicle, the peephole can be moved along during the ride.

The doors and/or side panels and/or the roof and/or the dashboard and/or the floor may be provided or formed by the pane with the display. By means of touch and/or gesture control, virtual peepholes can be made through the components of the motor vehicle, which represent doors and/or side panels and/or roof and/or dash panel and/or floor.

The interactive peepholes offer a high degree of flexibility. This is above all an advantage with a piloted motor vehicle. For example, if the motor vehicle is driving at night and the occupants are asleep, one of the occupants, who is awake and wants to look outside without disturbing the other, may form one or a plurality of peepholes. The peepholes can be automatically closed or pinned. The shape of the peepholes can optionally be adapted. For example, the peepholes can be formed or shaped like a circle or rectangle or hexagon or like a slot. In a digital manner, physical materials such as textile or slats can be optically imitated as roller blinds or visibility screens. When an object is viewed through a hole or peephole, the hole or peephole can move so that it compensates for movement from the vehicle and the object always remains visible. Children can make a game of this, for adults there is also a "joy-of-use." A privacy area can be individually designed with peepholes.

The invention claimed is:

1. A method for operating an interactive visibility screen on a transparent pane of a pane device in a motor vehicle, wherein the interactive visibility screen is generated on the pane by means of a display unit of the pane device by pixel-wise fade-in of opaque image points, wherein the opaque image points form a coherent visibility screen area, the method comprising:
    detecting an activation action by a user by means of a detection device, the detection of the activation action activating the display unit, the detection of the activation action further allowing the user to subsequently use an operational action to adjust the visibility screen;
    detecting the operational action by the user by means of the detection device, wherein the operational action comprises a selection of a setting range and a movement relative to the pane;
    setting an expansion of the coherent visibility screen area at the setting range as a function of the movement relative to the pane by means of a control device;
    opening at least one predetermined area of the coherent visibility screen area based at least in part on the setting; and
    automatically closing the at least one opened predetermined area of the coherent visibility screen after a predetermined period of time after detecting the operational action.

2. The method according to claim 1, wherein opening the at least one predetermined area of the coherent visibility screen comprises fading out one or more opaque image points in the predetermined area of the coherent visibility screen.

3. The method according to claim 2, further comprising:
    detecting a viewing direction of the user; and
    moving the at least one predetermined area of the coherent visibility screen area within the coherent visibility screen area as a function of the viewing direction of the user.

4. The method according to claim 1, wherein:
    the setting the expansion of the coherent visibility screen area is set only after identification of the user, and the operational action by the user is on an area of the pane accessible from outside the motor vehicle.

5. The method according to claim 1, wherein:
at least one first operating gesture is detected as the movement, and
at least two fingers of the user are moved relative to one another from a starting position in the at least one first operating gesture.

6. The method according to claim 1, wherein:
at least one second operating gesture is detected as the movement, and
the user performs a wiping motion or a painting motion on the pane or free in the air with one hand or at least one finger in the at least one second operating gesture.

7. A pane device for a motor vehicle, the pane device comprising:
a transparent pane;
a display unit configured to generate a visibility screen on the transparent pane by pixel-wise fade-in of opaque image points, wherein the opaque image points form a coherent visibility screen area;
a detection device configured to detect an activation action of a user and an operational action of the user, wherein detection of the activation action activates the display unit and further allows the user to subsequently use the operational action to adjust the visibility screen, and wherein the operational action comprises a selection of a setting range and a movement relative to the pane; and
a control device configured to set an expansion of the coherent visibility screen area at the setting range as a function of the detected movement, open at least one predetermined area of the coherent visibility screen area based at least in part on the setting of the expansion of the coherent visibility screen, and automatically close the at least one predetermined area of the coherent visibility screen subsequent to the opening of the at least one predetermined area of the coherent visibility screen.

8. The pane device according to claim 7, wherein the control device is further configured to open the at least one predetermined area of the coherent visibility screen by fading out one or more opaque image points in the predetermined area of the coherent visibility screen.

9. The pane device according to claim 7, wherein the control device is further configured to set the expansion of the coherent visibility screen area only after identification of the user, and
wherein the operational action by the user is on an area of the pane accessible from outside the motor vehicle.

10. The pane device according to claim 7, wherein the detection device is further configured to detect at least one first operating gesture as the movement, and
wherein at least two fingers of the user are moved relative to one another from a starting position in the at least one first operating gesture.

11. The pane device according to claim 7, wherein the detection device is further configured to detect at least one second operating gesture as the movement, and
wherein the user performs a wiping motion or a painting motion on the pane or free in the air with one hand or at least one finger in the at least one second operating gesture.

12. A motor vehicle with a pane device, the motor vehicle comprising:
a transparent pane;
a display unit configured to generate a visibility screen on the transparent pane by pixel-wise fade-in of opaque image points, wherein the opaque image points form a coherent visibility screen area;
a detection device configured to detect an activation action of a user and an operational action of the user, wherein detection of the activation action activates the display unit and further allows the user to subsequently use the operational action to adjust the visibility screen, and wherein the operational action comprises a selection of a setting range and a movement relative to the pane; and
a control device configured to set an expansion of the coherent visibility screen area at the setting range as a function of the detected movement, open at least one predetermined area of the coherent visibility screen area based at least in part on the setting of the expansion of the coherent visibility screen, and automatically close the at least one predetermined area of the coherent visibility screen subsequent to the opening of the at least one predetermined area of the coherent visibility screen.

13. The motor vehicle of claim 12, further comprising:
an additional detection device directed toward surroundings of the motor vehicle,
wherein the control device is configured to assign a point in the surroundings of the motor vehicle fixed by eyes of the user through at least one predetermined area opened in the coherent visibility screen area to an image point detected by the additional detection device, and
wherein the control device is configured to shift the at least one predetermined area within the coherent visibility screen area such that the point fixed by the eyes of the user continues to be fixed by the eyes of the user through the at least one predetermined area during the movement of the motor vehicle.

14. The motor vehicle according to claim 12, wherein the control device is further configured to open the at least one predetermined area of the coherent visibility screen by fading out one or more opaque image points in the predetermined area of the coherent visibility screen.

15. The motor vehicle according to claim 12, wherein the detection device is further configured to detect a viewing direction of the user, and
wherein the control device is further configured to move the at least one predetermined area of the coherent visibility screen area within the coherent visibility screen area as a function of the viewing direction of the user.

16. The motor vehicle according to claim 12, wherein the control device is further configured to set the expansion of the coherent visibility screen area only after identification of the user, and
wherein the operational action by the user is on an area of the pane accessible from outside the motor vehicle.

17. The motor vehicle according to claim 12, wherein the detection device is further configured to detect at least one first operating gesture as the movement, and
wherein at least two fingers of the user are moved relative to one another from a starting position in the at least one first operating gesture.

18. The motor vehicle according to claim 12, wherein the detection device is further configured to detect at least one second operating gesture as the movement, and wherein the user performs a wiping motion or a painting motion on the pane or free in the air with one hand or at least one finger in the at least one second operating gesture.

* * * * *